Aug. 21, 1928.  1,681,441
A. G. SHERMAN ET AL
CONTINUOUS PORCELAIN MILL
Filed May 21, 1925    11 Sheets-Sheet 6

Inventors
Alvin G. Sherman
Albert Meadows
By Stuart C. Barnes
Attorney

Patented Aug. 21, 1928.

1,681,441

UNITED STATES PATENT OFFICE.

ALVIN G. SHERMAN AND ALBERT MEADOWS, OF DETROIT, MICHIGAN, ASSIGNORS TO DETROIT VAPOR STOVE COMPANY, OF DETROIT, MICHIGAN, A CORPORATION OF MICHIGAN.

CONTINUOUS PORCELAIN MILL.

Application filed May 21, 1925. Serial No. 31,811.

This invention relates to a continuous mill for glass-enameling metal articles.

We use "porcelain" and "glass-enameling" as synonymous terms. It is the object of the invention to provide a mill for continuously working on the article in predetermined time periods from the time the process is first undertaken until it is finally finished. The several instrumentalities are so co-ordinated in capacity, speed and distance of travel that they all work together to apply the several coats of glass enamel to the article as it travels through the line of instrumentalities.

It is the usual practice in applying porcelain to sheet metal articles, such as stove plates and the like, to perform the several operations separately. The metal has to be cleaned by giving it several baths in cleaning acids, such as acids for removing the grease and rust. The work is then conveyed on trucks in stacked relation to a dip tank. Here they are dipped in the ground coat of porcelain, and this is usually also brushed over the plate so as to make sure that the ground coat takes hold of the entire plate. The plates are then set upright and allowed to run and drip; they are then returned to the trucks and stored on racks. They are then taken off the trucks and placed on a suitable carriage in large gangs and fed into a muffle furnace and heated until they are in a dull red-hot condition. This is the firing operation, which is in reality an intermittent operation; the work is loaded into the furnace in gangs, then left in the furnaces for a certain length of time and then removed. Also plates after being dipped or sprayed with the ground or color coat, while awaiting to be fired are very readily injured by contact with each other. Then they are taken out, transferred to the racks on the truck and left to cool on these racks. These trucks are then wheeled to the spraying booths, the plates taken off and the first white coat is sprayed on. They are again stacked on the racks on the trucks and wheeled to the edging department. This is an operation for wiping the white or color coat off along the edges to prevent chipping in the finished product. The edged plates are then laid back in the racks and stored until they are thoroughly dry. They are then again fed into the firing furnace in gangs on a carriage. The same operations are repeated for the third coat. None of these operations, or at least most of them have no time regulation other than human timing, and no means is provided to assure a sequence of operation in regular order on the individual units of work or at any certain time intervals. Some of the racks may get side-tracked and left unnoticed for a considerable length of time, which impairs the quality of the finished product.

It is the object of my invention to provide an apparatus so designed, so co-ordinated in speed, capacity and distance of travel that the plates are fed in a continuous line or lines through the porcelain mill, and are continuously undergoing the several processes until they issue as a finished product at the final end of the apparatus. Such a mill nicely controls all the time elements both of an operation and between operations.

By performing these actions on the work in continuous succession, it is found that it saves almost a half of the cost of porcelain work, and it also does a much superior grade of work, due to accurately controlling the time factors both in operations and between operations. This eliminates deterioration due to undesirable physical and chemical changes, such as moisture content, dust, lack of or excess of drip, too little or too great fusion in firing, excess or too little acid in cleaning, etc.

Reference is made to our copending case of even filing date, Serial No. 31,810, in which the process is claimed.

Figure 1:
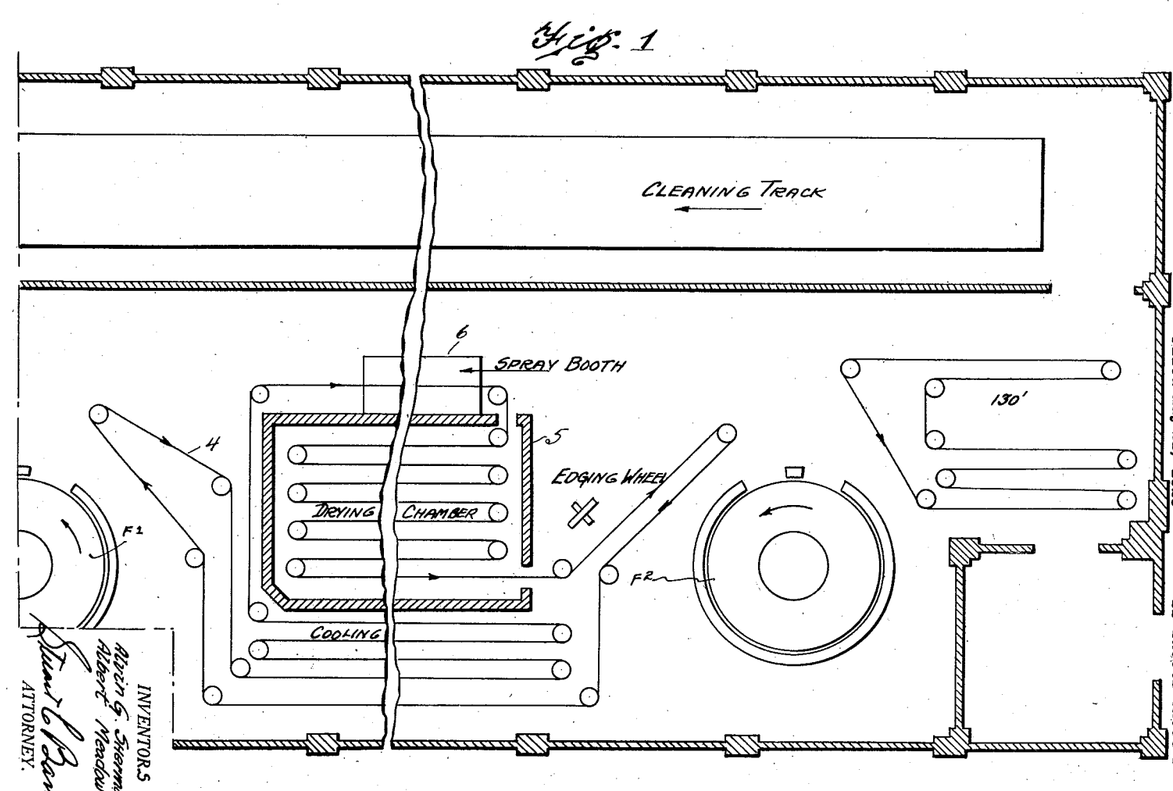
Fig. 1 and Fig. 1ª are two portions of one diagrammatical view of the entire installation.
Figure 2:
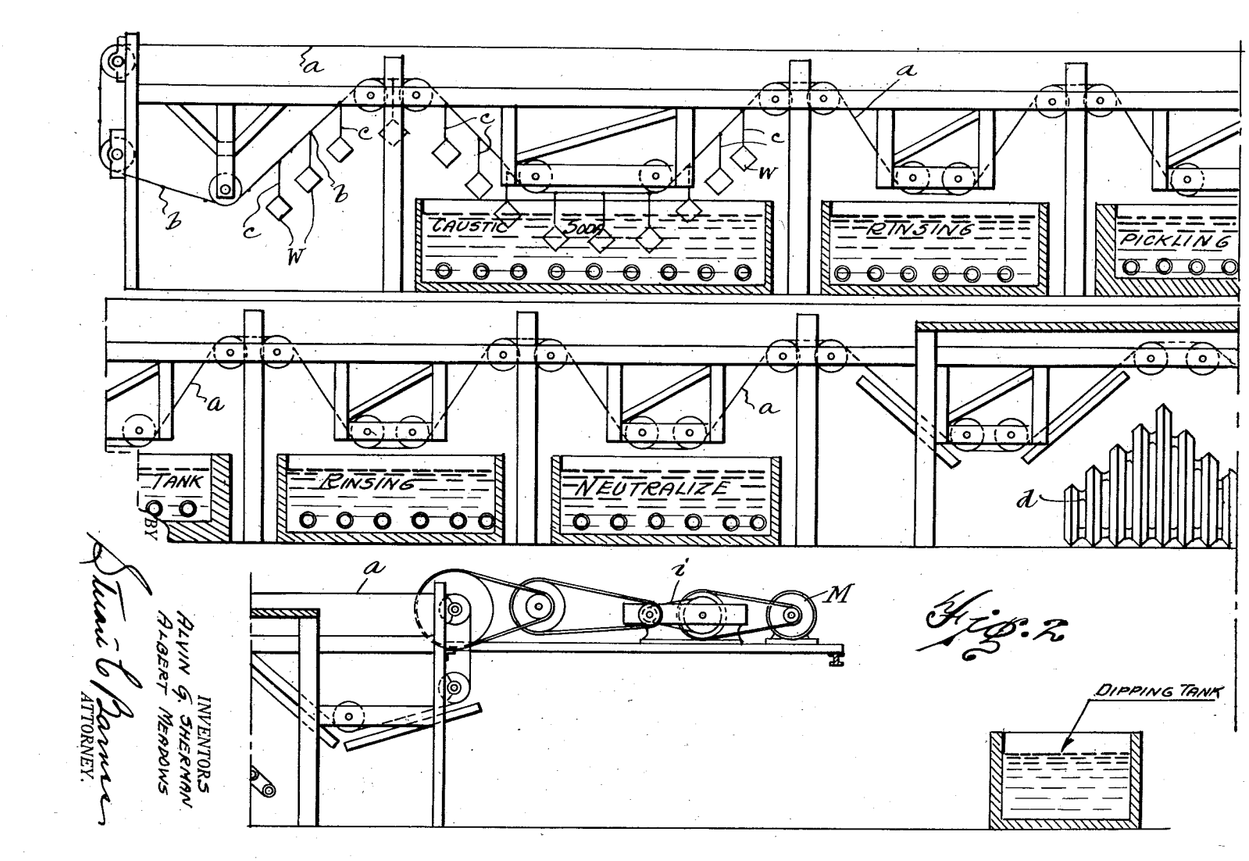
Fig. 2 is a diagrammatical side view, split up in three parts, showing the cleaning apparatus.
Figures 3, 4:
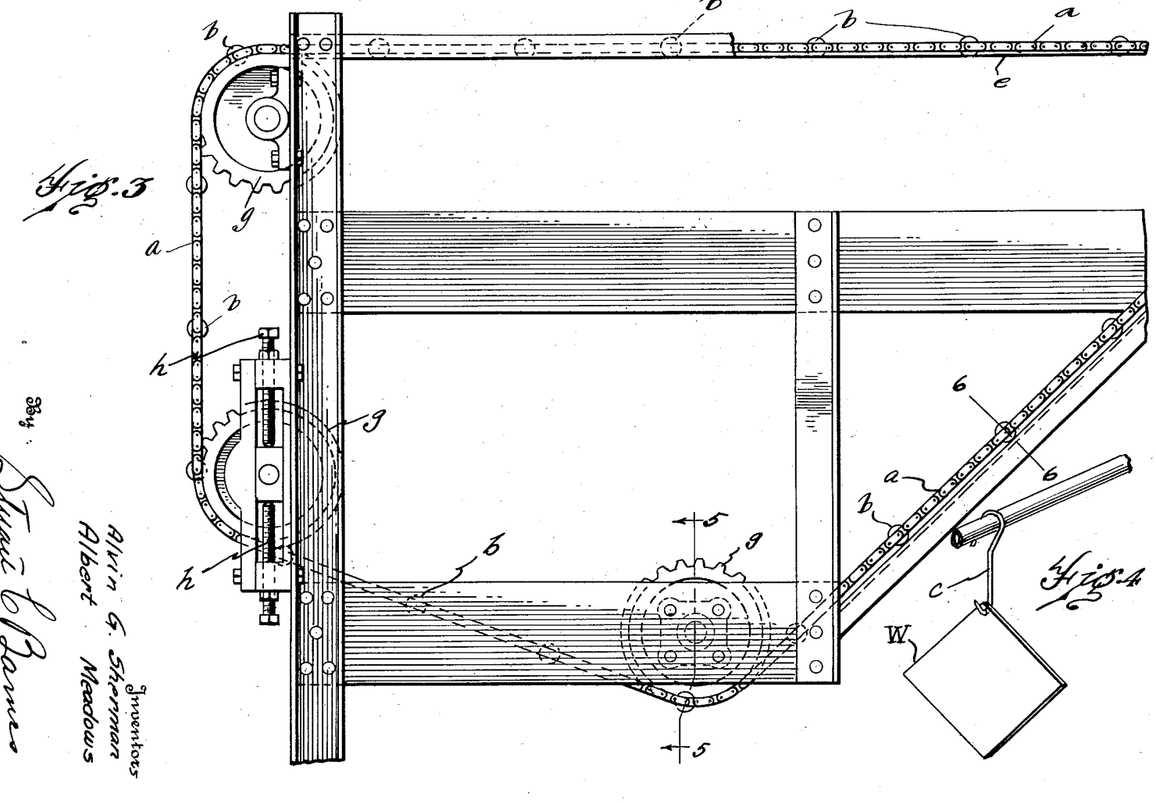
Fig. 3 is a fragmentary side elevation of the conveyor for the cleaner apparatus.
Fig. 4 is a detail in perspective of one of the conveyor rods.
Figure 5:
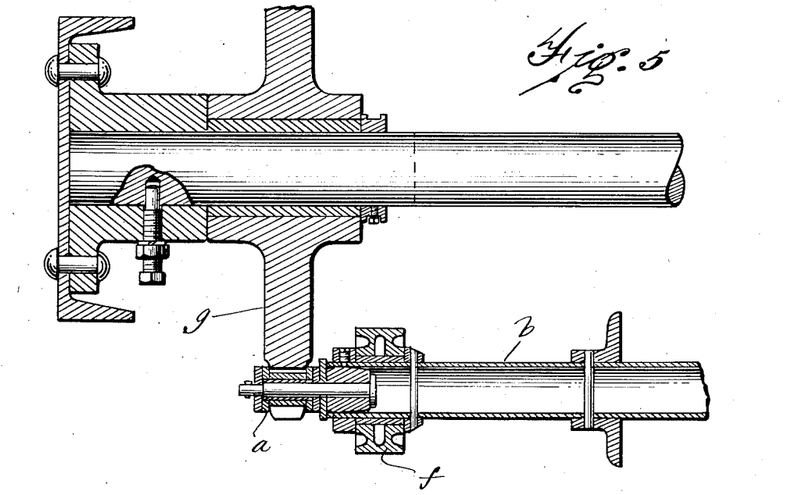
Fig. 5 is a section on the line 5—5 of Fig. 3.
Figure 6:
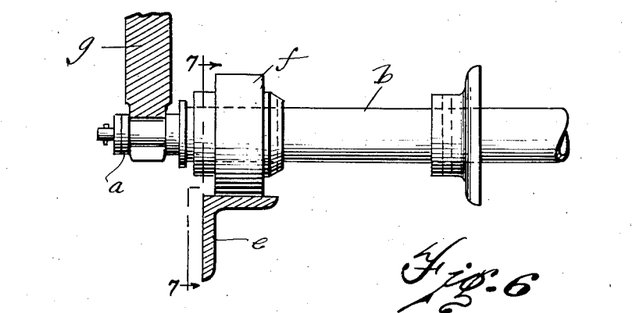
Fig. 6 is a section on the line 6—6 of Fig. 3.
Figure 7:
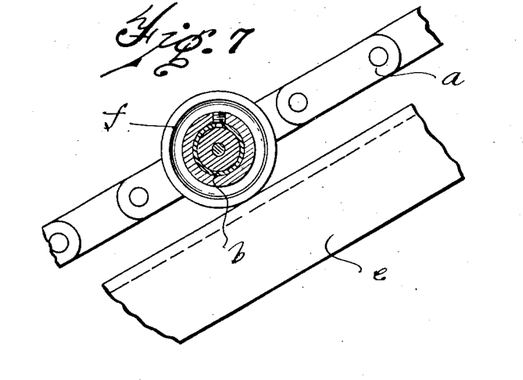
Fig. 7 is a section on the line 7—7 of Fig. 6.
Figure 15:
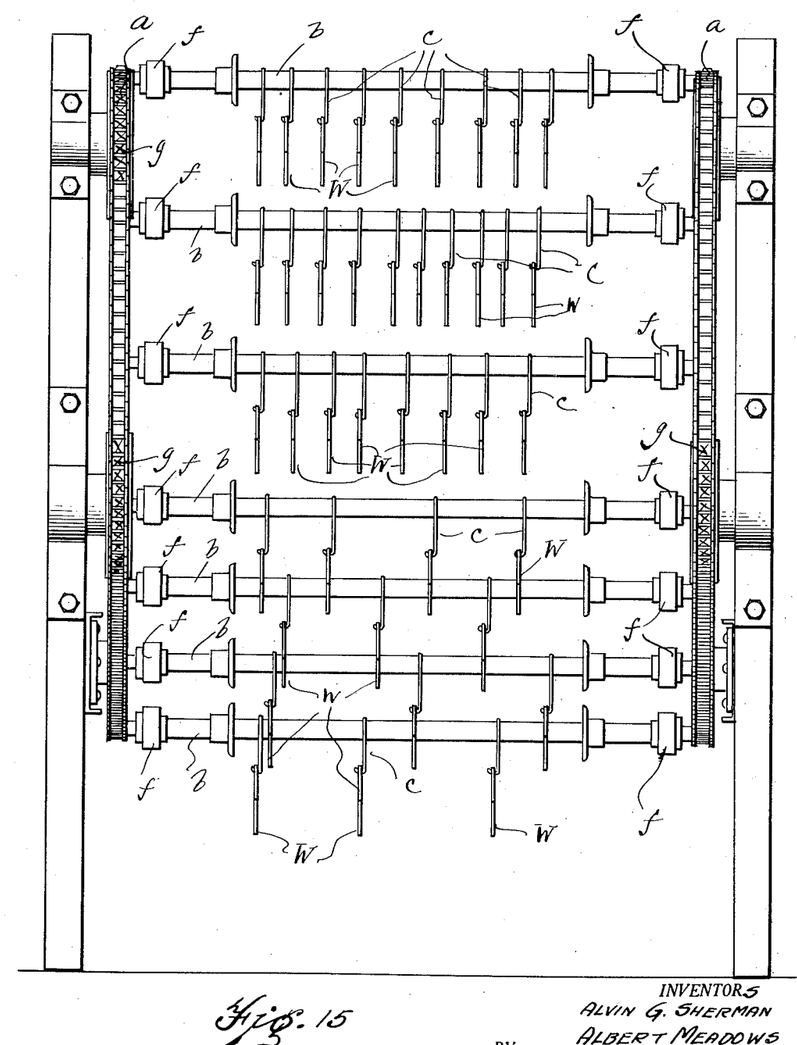
Fig. 15 is a front elevation of the cleaning apparatus showing how the work may be loaded onto the conveyor.

Now referring to Figs. 1 and 1ª, which should be read together, the whole installation will be seen in plan or diagrammatic view. The first instrumentality is the cleaning instrumentality. Now referring to Fig. 2, which should be read beginning the upper left hand corner, this is a conveyor of the chain type, the chain being designated $a$. This is provided with a plurality of transverse rods $b$. Over these are the hooks $c$, which hook into the perforations in the corners of the plates W, which indicates the work. It is not necessary to give all the parts of this conveyor in detail as obviously the detail is not the essence of the invention. Suffice it to say that these plates are preferably carried in a plurality of lines (there being sometimes as many as twelve plates hooked onto each transverse rod; see Fig. 15). They are carried first into the cleaning tank containing an alkaline cleaning solution such as caustic soda, and which is at a boiling temperature, for removing the grease; it is then automatically lifted out and carried into the hot water rinsing tank, thence into the pickling tank, again into a rinsing tank, and finally into a mild caustic soda tank intended to neutralize the acid. After the work leaves the neutralizing tank, it is carried by the conveyor down over the steam coils $d$ for drying off the water. Preferably the skeleton structure that supports the cleaning conveyor is provided with tracks $e$, on which the rollers $f$ of the transverse shafts $b$ turn. The chain $a$ works over the sprocket wheels $g$. One of these is shown in the left of Fig. 3; these can be adjusted by the screws $h$ to adjust the tension. At the delivery end of the cleaning conveyor, a drive is provided by a motor M, located on the super-structure, with a suitable variable transmission $i$. This permits the adjustment of the speed of the conveyor for a purpose shortly to be described.

Figure 1A:
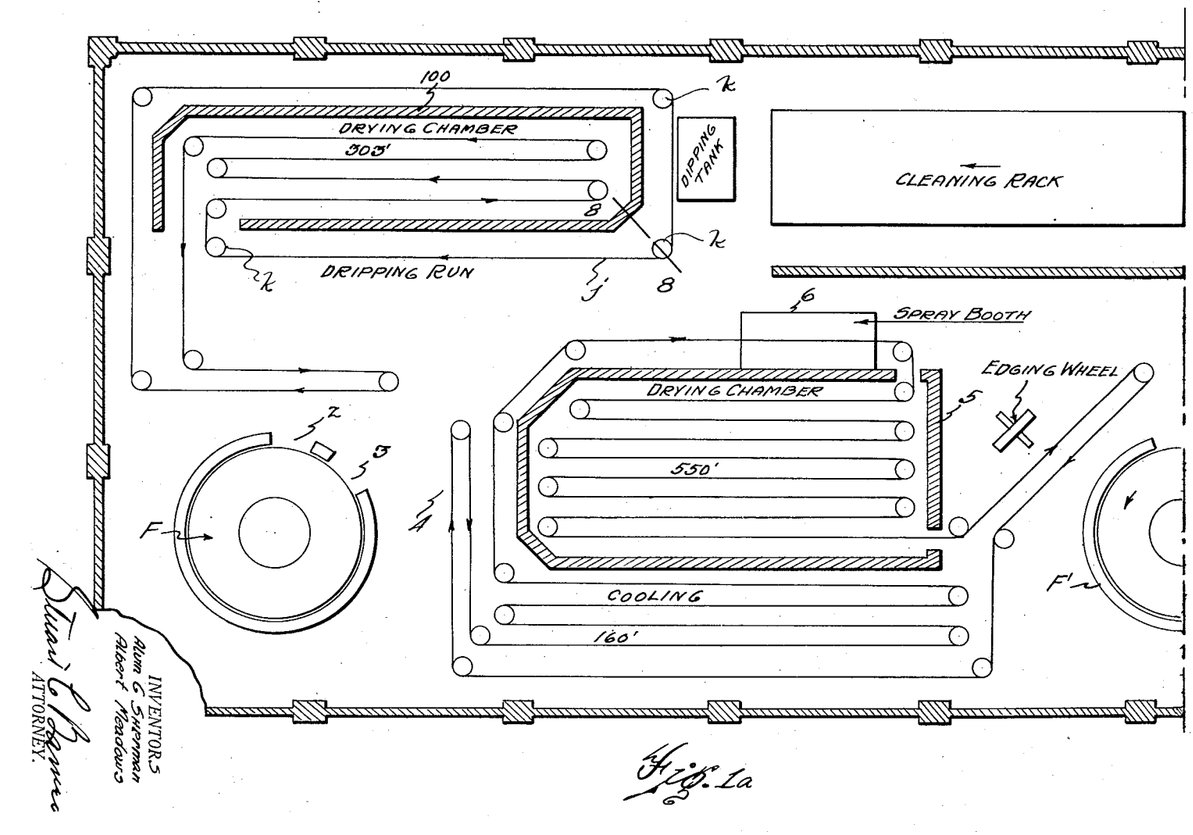

Now referring to the plan view of Fig. 1 and 1ª again, it will be seen that the delivery end of the cleaning conveyor is immediately adjacent the dipping tank. The work is taken off the cleaning conveyor, preferably by an operator who dips the plates in the ground-coat tank. This ground coat is necessary in all porcelain work in order to make the enamel stick to the metal. It contains a cobalt oxide which makes the ground coat a blue coat. It is not only desirable to dip the plate into the tank, but it is found preferable to also brush the ground coat liquid over the plate on both sides so as to assure its sticking to the plate. This could conceivably be done by machinery, but it is found cheaper and more effective to have it done by a human agency. Another advantage is that the operator can inspect the work and return defective plates. One or two operators can take the plates as they come from the cleaning conveyor, and dip and brush them with the ground coat.

Figures 8, 9:
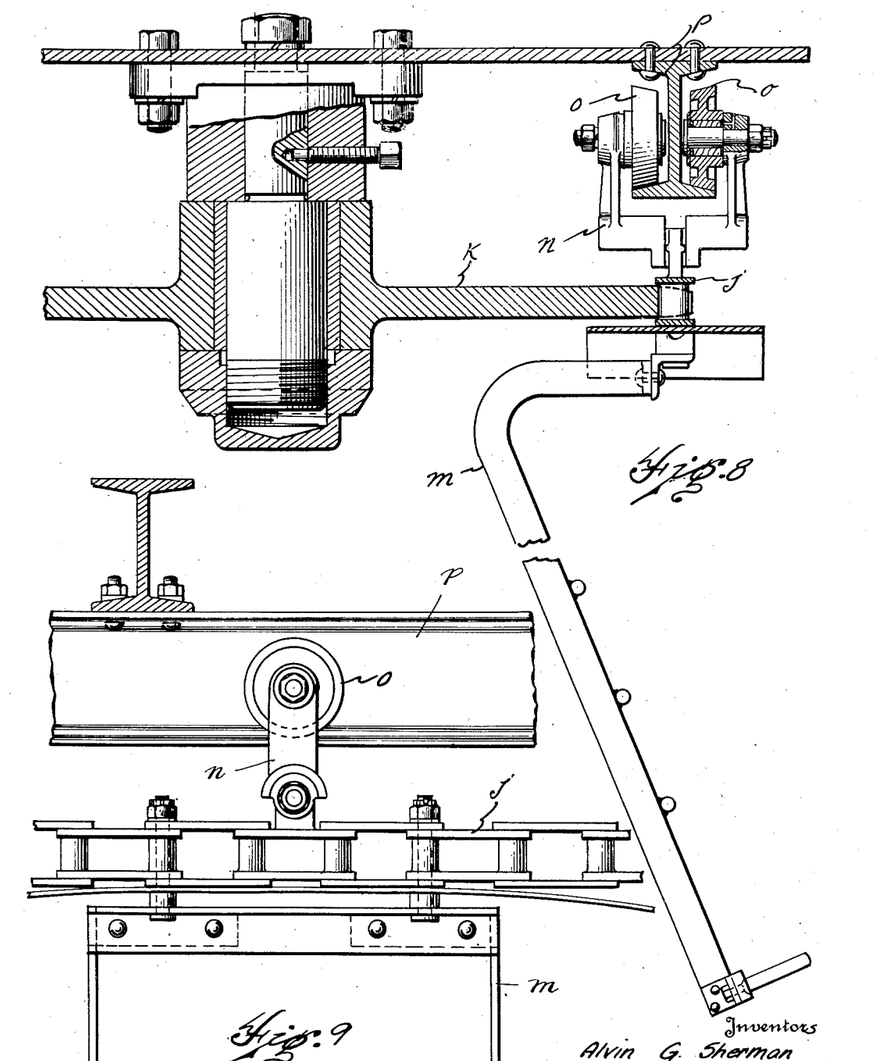
Fig. 8 is a section on the line 8—8 of Fig. 1ª.
Fig. 9 is an elevational view of the parts shown in Fig. 8, taken from the right of Fig. 8.

The plates are then set on the dripping and drying conveyor that runs immediately above the dipping tank. The specific details of this conveyor are not essential to the invention, but one advantageous form is portrayed in Figs. 8 and 9. A chain $j$ runs over the sprocket wheels $k$. This is provided with depending easels $m$ formed by suitable frames or brackets. The top of the chain is provided with yokes $n$ on which are supported trolley wheels $o$, which run on the I-beam track $p$. Any one of these sprockets can be the driving sprocket and connected with a "Reeves" variable speed transmission and a motor. This is simply one of the preferred forms of providing a controllable and variable speed drive for this conveyor. This conveyor, it will be seen from the diagrammatic view 1ª, takes the work when it is set on the easel and runs it for a short run on the outside of the driving chamber. This may be termed the dripping operation. The ground coat will, of course, run after the dipping operation, and this amount of travel permits all the excess to drip off, but not too much to drain off before it becomes immobile due to the application of the heat of the drying chamber.

The drying chamber 100 is a brick enclosure, preferably kept at 200 degrees Fahrenheit by steam coils. The conveyor runs back and forth several times through this drying chamber. There are four runs of the conveyor shown in the drying chamber, preferably about 303 feet of travel. The speed and the distance of travel through the drying room is so regulated that when the conveyor with the easels and the work issues out of the drying room, the plates are substantially dry. It is preferred to give the drying rooms an excess drying capacity so that the speed may be varied, depending upon the class of work going through, and different furnace speeds.

The conveyor then runs across the mouth of the first firing furnace F. This furnace is preferably a circular conveyor type of furnace. It is made circular so that it can have a continuously moving platform for carrying the work in progression through the firing area. The details of this furnace might be varied within side limits. However, in Fig. 10 a suitable furnace for this purpose is shown. This comprises a suspended circular platform $q$, which is supported from the thrust bearing $r$ by means of the suspension rods $s$. Upstanding from this circular platform are a plurality of posts $t$, which support the ring-like framework $u$, which in turn supports the pin-carrying bars $w$. These pin-carrying bars form a surface on which to lay the work. This ring-like carrier rotates in the annular furnace chamber $v$, which is constructed of suitable fire brick. Electric resistance heating elements $y$ project into the furnace chamber and are located immediately above the ring-like carrier.

Figure 10:
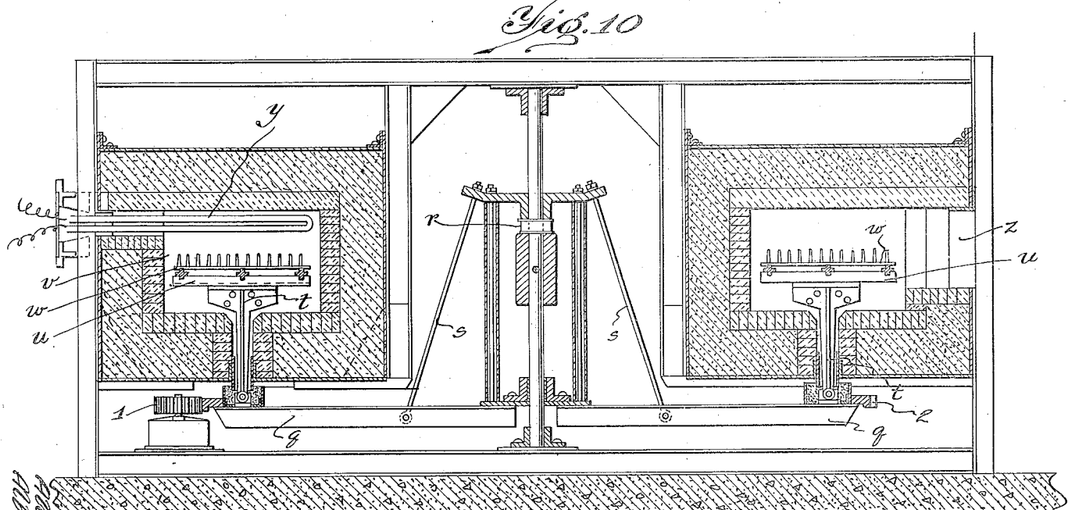
Fig. 10 is a vertical section through one of the firing ovens.
Figure 11:
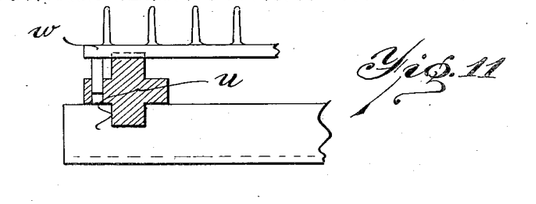
Fig. 11 is a detail of the revolving floor of the oven.
Figure 12:
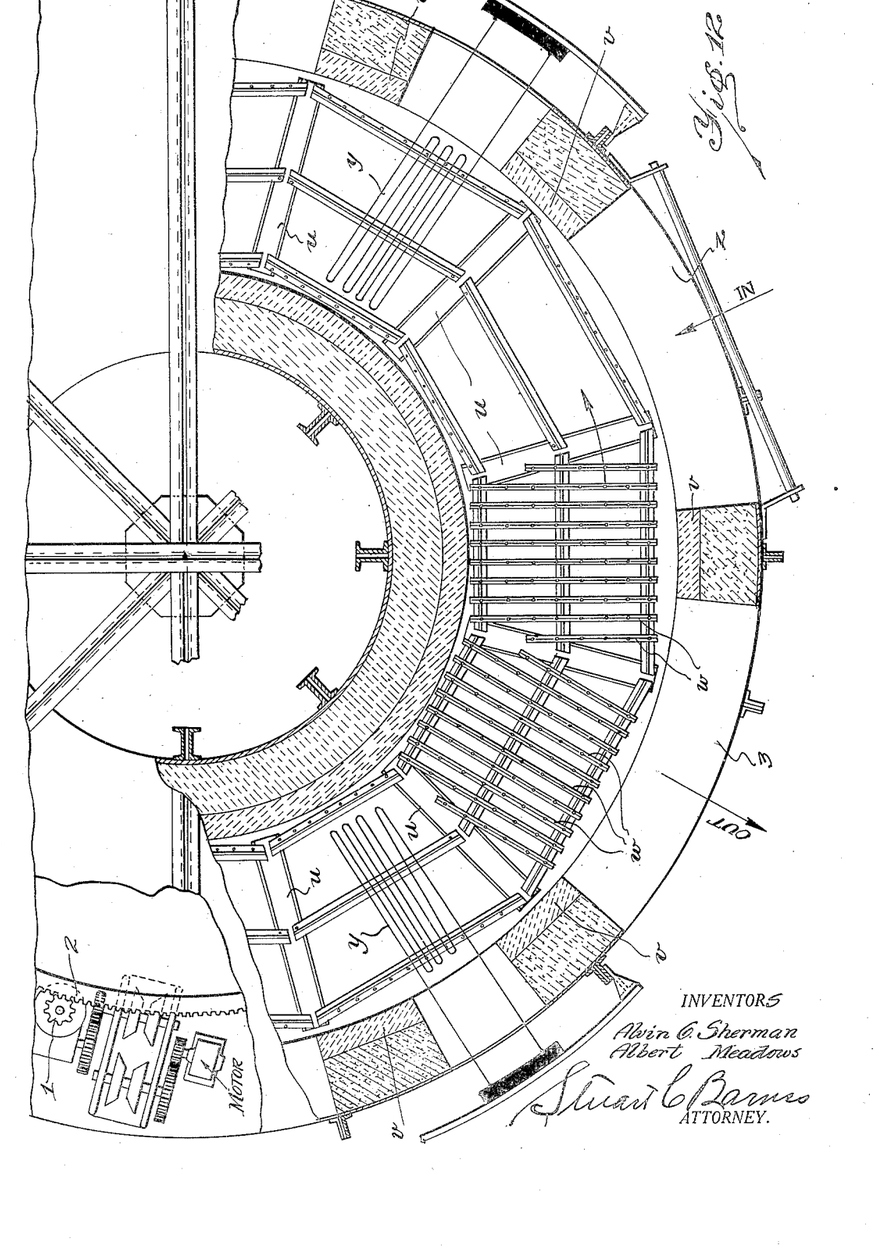
Fig. 12 is a plan view of the furnace.
Figure 13:
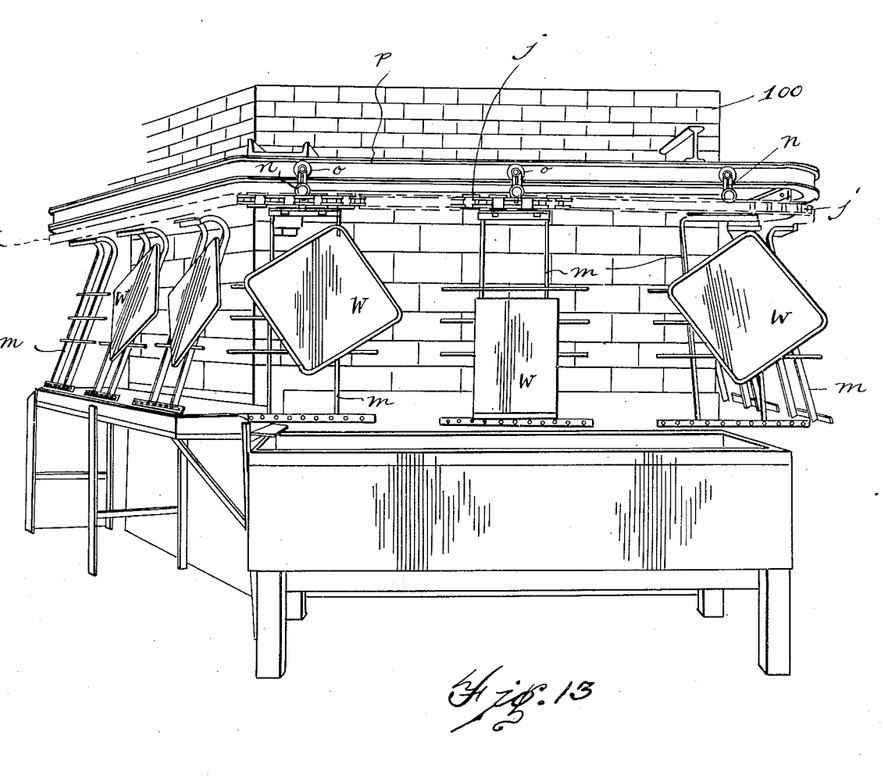
Fig. 13 is a perspective view of the dipping tank, showing the relation of the conveyor therewith.
Figure 14:
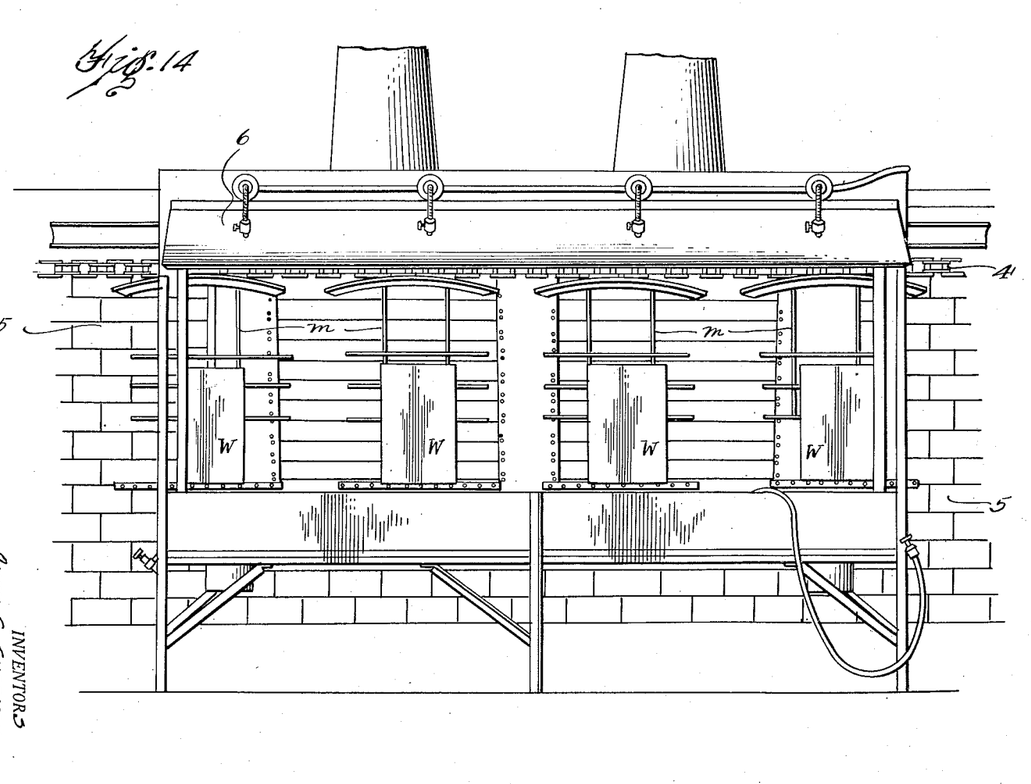
Fig. 14 is a perspective of the spray booth showing the conveyor passing therethrough.

An operator takes the plate with the dry ground coat off the conveyor as it passes immediately in front of the furnace and passes it through the opening $z$ into the furnace. It then rotates upon the ring-like carrier in the furnace and is exposed to the intense heat of the electric resistance elements which maintain a uniform temperature in the furnace. This is regulated so that in the furnace the heat approximates 1600 degrees Fahrenheit. The ring-like carrier is driven by a pinion 1, meshing with the large ring gear 2. This may be driven by suitable transmission or power connection which has an adjustable speed; preferably the range of speed for the ring carrier is about 1 revolution every two or three minutes, or on an average of about 1 revolution every 2½ minutes. Preferably the heating elements are not located in the furnace at the doorways. This makes the heat in front of the furnace tolerable to the workmen.

The enameled plates or articles rotate slowly through the heated areas of the furnace until they come to the opening 3, where the same workman, or another, using a long fork, lifts the red-hot plate off the prongs of the carrier and places it on the conveyor 4. This is provided with casels precisely like the conveyor in the drying chamber, which has already been described. This transfer from the drying chamber conveyor to the furnace, and from the furnace to the cooling-spraying-drying room conveyor could, of course, be accomplished automatically by machinery, but the complications and the expense are such that the same can be more economically and better performed by human agency. In addition, it is preferable to insert the human agency at this point for improperly coated plates can be detected by the operator and returned for a new coat before being fused in the furnace. It would be more difficult to reclaim bad plates after firing.

Here it may be well to explain how these several elements are all co-ordinated together so as to form one complete and continuous mill, as opposed to separate instrumentalities brought merely into convenient juxta-position. Taking the cleaning conveyor: this conveyor is co-ordinated in speed and capacity, and accomplishment, so as to exactly meet the capabilities and needs of the dipping tank and the dripping and drying conveyor, which are located immediately at the delivery end of the cleaning conveyor. It is found desirable to run the cleaning conveyor at very much reduced speed in order to permit the articles to remain in the various tanks a longer period. Hence the speed of the cleaning conveyor is only about one-half or less of the speed of the dripping and drying conveyor. The 12 or less lines of the articles are simultaneously carried by the cleaning conveyor so as to co-ordinate its capacity exactly with that of the dripping and drying conveyor.

Now in order to exactly prepare the cleaning apparatus for the dip tank, after the plates have gone through the various tanks, they go through a warming zone for forcing and insuring the drying (irrespective of atmospheric condition) so that when they are delivered at the delivery end of the conveyor they will be in exactly the right shape to go through the dipping operation.

After the dipping operation, the conveyor circulates outside of the warming oven just long enough to permit the flow of the excess of the ground coat on the plates and the dripping off of the excess before the coat is presented to the heat of the drying oven, which is calculated to give the coat a temporary fixedness by evaporating the volatile content of the ground coat. After passing through the drying chamber, the conveyor carries the work directly to the firing furnace.

Here it may be noted that the speed of this drying conveyor and the longevity of travel through the drying conveyor is not only co-ordinated with the cleaning apparatus but also with the furnace. The drying operation at 200 degrees F. takes much longer than the firing operation. For instance, there is approximately 303 feet of conveyor in the drying room, traveling at an average speed of about 20 feet per minute. This means that the article is in the drying room over 15 minutes; it is then conveyed directly to the furnace. The average speed of the furnace carrier ring is about 1 revolution in 2½ minutes; hence the articles in the furnace are in about one-sixth of the time that they are in the drying room. This longer period in the drying room is secured not by slowing up the conveyor but by simply lengthening out the path of travel of the conveyor by doubling back and forth. Therefore this delay in the drying room does not interfere with the supply of work to the furnace. The drying room simply is loaded up with a larger number of articles and have a longer path of travel than is the case with the furnace, but the conveyor speed is such as to supply the capacity of the furnace. The per-foot travel of the furnace conveyor does not have to be exactly that of the supplying conveyor or the take-away conveyor for the reason that the work can be laid closer together on the ring carrier of the furnace than is permitted by the fixed easels on the other conveyors—or if the ring conveyor is wide enough and the articles narrow enough, they can be arranged in a double line on the conveyor, thereby increasing its capacity for its speed. The essential feature, however, is that the furnace be able in a given-time unit to handle the same number of work units as the several conveyors. It is more economical to work the furnace at a full capacity.

This coordination of capacity of each of the conveyors in a given unit insures a continuous mill operation, which is the objective of this invention. Inasmuch as the time of immersion in a bath, the time required for dripping, for drying, and for firing are all variant, this has to be coordinated by either varying the length of the path of travel as with the warming chamber and the dripping run, or the number of articles handled simultaneously as with the cleaning instrumentality, or the spacing of the articles in succession, as in the firing furnace.

These modifications can all easily be made so as to vary the time factor according to the needs of each operation, and yet in no way interfere with the continuous progression on schedule of the work from its raw state to its finished condition. On the other hand, these time factors are also scrupulously worked out so that the application of any operation is no longer than is absolutely required. In this way the storage of the article while awaiting any of the porcelain operations is absolutely eliminated. There are two purposes which make it desirable to eliminate storage. One is that the storage involves increased plant investment in space, and also requires trucking and handling; and the storage involves the exposure of the work to atmosphere longer than is necessary, or allows the work to be fed to the next operation prematurely.

Another factor that must be borne in mind is that when each one of these instrumentalities has been properly adjusted or attuned to perform its function in the continuous mill operation, it becomes determinative of the conditions to which the work is exposed, so as to almost completely eliminate the human factor in securing uniformity of product. For instance, the bare plates are exposed for just a given time in each tank, and are in no way dependent on the workman's attention in taking them out. The dipping and scrubbing action must go on at a predetermined speed in order to keep up with the easels as they come along the dripping and drying conveyor. The dripping action is prolonged just a defined time before the heat of drying is applied. The drying action is applied at a precisely uniform time on each piece of work, and as each piece of work passes through identically the same source of heat, they are bound to be absolutely all uniform. The firing time is also uniform for every article, and the human factor is completely eliminated in this important operation, provided the workman takes the work out when it comes around to the delivery opening.

The firing operation is not a baking operation but a fusing one, as the temperature is very high—1600 degrees F., and the metal and the porcelain are heated to a dull red heat. This results in a fusing of the glass in the metal or the porcelain, to make a hard vitreous, almost non-scratchable finish.

After the plates have been taken off the furnace floor with forks, they are laid on the next conveyor, which is the cooling-spraying-drying conveyor, designated 4. It will be noticed that this conveyor has a large number of runs outside the drying chamber 5, preferably about 160 feet. This is the travel necessary at the scheduled rate of the work through the mill to properly cool the work as it comes in the red hot condition from the furnace. The conveyor then runs through the spray booth 6, where a sprayer with spray guns of the atomizing type, sprays the work running on the conveyors with the first coat of white enamel; this is white glass enamel, or porcelain. The work then continues on through the drying chamber, where within the best calculations just the right amount of travel to properly dry the coat is had. We have found in our work so far that this conveyor should be approximately 550 feet long at the average speed that we operate the conveyor, at about 20 feet per minute.

The work then passes by an edging wheel. Here, one or more operators temporarily take it off the conveyor and subject it to the high speed revolving brush, which wipes off the first white enamel coat along the edges. This is usually done with the aid of some kind of a pattern to cover up the major portion of the enamel coat. This is an old operation, and is found desirable in all porcelain work to prevent the white coat reaching out the extreme edge where it would be easily chipped.

The work is again replaced on the traveling easels and the conveyor loop runs in front of the second furnace F¹, which is the first color coat firing furnace. Precisely the same operation in the firing furnace occurs as with the first furnace, except that preferably the temperature of this furnace is somewhat less than the previous one, viz: about 1550 degrees Fahrenheit. It is usual to add a third coat or a second enamel coat to all porcelain work, consequently a second cooling run of conveyor, a second spraying booth, and a second drying chamber are all provided and clearly shown in Fig. 1, of the drawings. The operations are precisely the same, and the work has to also be temporarily taken off the conveyor to be given an edging operation. It is then finally fired in the furnace F², and then placed upon the final cooling conveyor, which is about 130 feet in length.

It will be understood that each of these conveyors are driven by a variable speed motor or power transmission, preferably an individual motor with a "Reeves" variable speed transmission. Hence, it is possible to vary the speed of any of the conveyors, but of course, it will also be necessary, if one conveyor is varied in speed, that the speed of all the other conveyors be varied in order to permit them to coordinate, except that it is possible with some of the instrumentalities such as the furnace, and the cleaning apparatus to vary the capacity, by either varying the number of lines of work or varying the spacing of the work as it is fed along. These adjustments may be necessary where the apparatus is used on a different character of work, as for instance, different character of metals, such as castings instead of sheet plates, or different compositions of porcelain. However, it may be necessary where quite radical changes are needed in any one of the instrumentalities to reconstruct some of the conveyor lines in order to get the proper length of travel to attune each instrumentality to its operation, and its required speed within the continuous mill.

It will be understood that the dimensions, time elements and specific character of the various instrumentalities are simply given as preferred constructions, or preferred directions with the experience that we have had at this time. They are subject to modification within wide limits, without departing from the spirit of our invention.

It will also be understood that partial continuous porcelain mills could be utilized with measurably good results. For instance, the entire cleaning instrumentality as an automatic feature could be eliminated, and this be done according to the old practice, but of course, with not as good results. So too, the drying-dipping-dripping apparatus could be eliminated as part of the continuous mill, but of course with still less advantageous results. Still again the second white enamel operation could be completely eliminated, or could be performed as it has always been performed in the past. Also the edging operation could be eliminated but with not very practical results.

We refer to this simply to show that we regard our invention to embrace not only the comprehensive continuous porcelain mill described, but also some of the subcombinations of instrumentalities and even some of the separate instrumentalities themselves in so far as the same are novel.

In the claims, the second and third coats are called the "color" coats, and of course "white" is considered a color. The first coat is designated the "ground" coat. In some of the claims reference is made to the "ground coat applying and treating"; this is the dipping and dripping and/or the drying operations.

What we claim is:

1. In an apparatus for the continuous enameling of metallic articles, a firing furnace provided with a continuously moving carrier, separate means for treating articles to be fired including conveyors coordinated as to speed, capacity and length of travel therewith to permit uninterrupted operation of the furnace and to control the time element of each treatment.

2. In an apparatus for the continuous enameling of metallic articles, a firing furnace provided with a continuously moving carrier, separate means for treating articles to be fired and for treating articles after they are fired, including conveyors coordinated as to speed, capacity and length of travel therewith, to permit uninterrupted operation of the furnace and to control the time element of each treatment.

3. In an apparatus for the continuous enameling of metallic articles, a firing furnace provided with a continuously moving carrier, separate means for treating articles to be fired and for treating articles after they are fired, including conveyors coordinated as to speed, capacity and length of travel therewith, to permit uninterrupted operation of the furnace and to control the time element of each treatment, and also the time element between each step of the continuous operation of the apparatus.

4. In an apparatus for the continuous enameling of metallic articles, a firing furnace provided with a continuously moving carrier, and separate, dripping and drying instrumentalities for treating articles to be fired, including conveyors coordinated as to speed, capacity and length of travel relative to the firing operation to control the time element of each treatment.

5. In an apparatus for the continuous enameling of metallic articles, a firing furnace provided with a continuously moving carrier, means for cleaning and controlling the applying of the ground coat to the articles to be fired, including conveyors coordinated as to speed, capacity and length of travel therewith to permit the correct and uninterrupted operation of the furnace and to control the time element of and between each treatment.

6. In an apparatus for the continuous enameling of metallic articles, a firing furnace provided with a continuously moving carrier, means for cleaning and controlling the applying of the ground coat to the articles to be fired and for cooling after they are fired including conveyors coordinated as to speed, capacity and length of travel therewith to permit the correct and uninterrupted operation of the furnace and to control the time element of and between each treatment.

7. In an apparatus for the continuous enameling of metallic articles, a firing furnace provided with a continuously moving carrier, means for cleaning and controlling the applying of the ground coat to the articles to be fired and for effecting the cooling, color coating and second firing including conveyors coordinated as to speed, capacity and length of travel therewith to permit the correct and uninterrupted operation of the furnace and to control the time element of and between each treatment.

8. In an apparatus for the continuous enameling of metallic articles, a firing furnace provided with a continuously moving carrier, means for effecting applying and drying of the ground coat before firing and for cooling after firing, including conveyors coordinated as to speed, capacity and length of travel therewith to permit the correct and uninterrupted operation of the furnace and to control the time element of and between each treatment.

9. In an apparatus for the continuous enameling of metallic articles, a firing furnace provided with a continuously moving carrier, and separate dripping and drying instrumentalities for treating articles to be fired and cooling, color coating and drying instrumentalities for treating articles after they are fired, including conveyors coordinated as to speed, capacity and length of travel relative to the firing operation to control the time element of each treatment.

10. In an apparatus for the continuous enameling of metallic articles, firing furnaces provided with a continuously moving carrier, ground coating instrumentalities for treating articles before first firing and color coating instrumentalities for treating articles after first and before second firing, including conveyors coordinated as to speed, capacity and length of travel relative to the firing operation to control the time element of each treatment.

In testimony whereof we have affixed our signatures.

ALVIN G. SHERMAN.
ALBERT MEADOWS.